(12) United States Patent
Olin et al.

(10) Patent No.: US 10,352,110 B2
(45) Date of Patent: Jul. 16, 2019

(54) MOUNTED DOWNHOLE FIBER OPTICS ACCESSORY CARRIER BODY

(71) Applicant: HALLIBURTON ENERGY SERVICES, INC., Houston, TX (US)

(72) Inventors: Gregory K. Olin, Spring, TX (US); Michael Edwin Pollard, Houston, TX (US); Brian Vandellyn Park, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 233 days.

(21) Appl. No.: 15/112,283

(22) PCT Filed: Apr. 25, 2014

(86) PCT No.: PCT/US2014/035425
§ 371 (c)(1),
(2) Date: Jul. 18, 2016

(87) PCT Pub. No.: WO2015/163909
PCT Pub. Date: Oct. 29, 2015

(65) Prior Publication Data
US 2016/0333646 A1    Nov. 17, 2016

(51) Int. Cl.
*E21B 17/02* (2006.01)
*E21B 47/01* (2012.01)
(Continued)

(52) U.S. Cl.
CPC ........ *E21B 17/1035* (2013.01); *E21B 17/026* (2013.01); *E21B 47/01* (2013.01);
(Continued)

(58) Field of Classification Search
CPC ....... E21B 17/026; E21B 47/01; G02B 6/504; G02B 6/50; G02B 6/2558
See application file for complete search history.

(56) References Cited

U.S. PATENT DOCUMENTS 3,844,345 A * 10/1974 Evans .................. E21B 17/203
138/111
5,404,080 A * 4/1995 Quazi ............... H05B 41/2925
315/151
(Continued)

FOREIGN PATENT DOCUMENTS

WO    2015163910    10/2015
WO    2015163912    10/2015

OTHER PUBLICATIONS

International Patent Application No. PCT/US2014/035425, International Search Report and Written Opinion, dated Jan. 22, 2015, 14 pages.

*Primary Examiner* — Shane Bomar
(74) *Attorney, Agent, or Firm* — Kilpatrick Townsend & Stockton LLP

(57) ABSTRACT

An assembly for use in a well, where the assembly includes a casing section, a modular carrier body, at least one securing ring, and at least one at least one port through the modular carrier body for connecting a compression fitting for at least one fiber optic line. The modular carrier body has a shape that can conform to the outer diameter of the casing section, and has a carrier body interior to house at least one fiber optic line, and a fiber optic line splicing assembly. At least one securing ring has a shape conformable to both the outer diameter of the casing section and a portion of a surface of the modular carrier body. The assembly can have two securing rings on either end of the modular carrier body as it is mounted to the casing.

18 Claims, 8 Drawing Sheets

(51) Int. Cl.
*G02B 6/255* (2006.01)
*E21B 17/10* (2006.01)
*E21B 47/12* (2012.01)
*G02B 6/50* (2006.01)

(52) U.S. Cl.
CPC .......... *E21B 47/011* (2013.01); *E21B 47/123* (2013.01); *G02B 6/2558* (2013.01); *G02B 6/504* (2013.01)

(56) References Cited

U.S. PATENT DOCUMENTS

| | | |
|---|---|---|
| 5,419,636 A | 5/1995 | Weiss et al. |
| 5,973,270 A * | 10/1999 | Keller ................. E21B 17/1035 174/136 |
| 6,215,939 B1 | 4/2001 | Cloud et al. |
| 6,571,046 B1 * | 5/2003 | Hickey ................. E21B 17/003 385/134 |
| 6,904,222 B2 | 6/2005 | Cooke et al. |
| 6,910,534 B2 * | 6/2005 | Linyaev ................. E21B 47/011 166/241.7 |
| 7,220,067 B2 * | 5/2007 | Rubinstein ........... G02B 6/2553 367/25 |
| 7,349,591 B2 | 3/2008 | Maas et al. |
| 7,600,928 B2 * | 10/2009 | Rubinstein ........... G02B 6/2558 385/100 |
| 7,641,395 B2 | 1/2010 | Ringgenberg et al. |
| 8,336,633 B2 | 12/2012 | Worrall, Jr. et al. |
| 8,755,663 B2 | 6/2014 | Strause et al. |
| 9,091,834 B2 * | 7/2015 | Jaaskelainen ........ G02B 6/4471 |
| 2003/0032157 A1 | 2/2003 | Hammond et al. |
| 2003/0192708 A1 | 10/2003 | Koehler et al. |
| 2004/0114463 A1 | 6/2004 | Berg et al. |
| 2004/0202401 A1 | 10/2004 | Berg et al. |
| 2006/0045408 A1 | 3/2006 | Jones et al. |
| 2006/0098932 A1 | 5/2006 | Battey et al. |
| 2006/0115335 A1 | 6/2006 | Allen et al. |
| 2006/0204181 A1 | 9/2006 | Reynolds et al. |
| 2007/0237467 A1 | 10/2007 | Rubinstein et al. |
| 2008/0073084 A1 | 3/2008 | Ringgenberg et al. |
| 2008/0311776 A1 | 12/2008 | Cox et al. |
| 2010/0018697 A1 * | 1/2010 | Richards ................. E03B 3/18 166/227 |
| 2010/0116509 A1 | 5/2010 | Robert et al. |
| 2010/0303426 A1 | 12/2010 | Davis |
| 2010/0303427 A1 * | 12/2010 | Rambow ............... E21B 47/011 385/95 |
| 2011/0135247 A1 | 6/2011 | Achara et al. |
| 2011/0155459 A1 | 6/2011 | Nicholson et al. |
| 2011/0266008 A1 | 11/2011 | Worrall, Jr. et al. |
| 2011/0286704 A1 * | 11/2011 | Rubinstein ........... G02B 6/3802 385/99 |
| 2013/0034324 A1 * | 2/2013 | Laing .................... G01K 11/32 385/13 |
| 2015/0309271 A1 | 10/2015 | Huegerich et al. |
| 2016/0069141 A1 * | 3/2016 | Blackmon ........... E21B 17/1035 166/380 |

* cited by examiner

MOUNTED DOWNHOLE FIBER OPTICS
ACCESSORY CARRIER BODY

CROSS REFERENCE TO RELATED
APPLICATIONS

This is a U.S. national phase under 35 U.S.C. 371 of International Patent Application No. PCT/US2014/035425, titled "Mounted Downhole Fiber Optics Accessory Carrier Body" and filed Apr. 25, 2014, which is herein incorporated by reference. This disclosure is related to the following two International Patent Applications filed the same day as this disclosure, (1) Application Serial No. PCT/US2014/035438, for "Optical Fiber Cable Splice Housings,", and (2) Application Serial No. PCT/US2014/035432, for "Hybrid Electrical and Optical Fiber Cable Splice Housings,", each of which is incorporated by reference.

TECHNICAL FIELD

This disclosure relates to fiber optic cables utilized in oil and other wells and other extreme environments and to splices and connections of such cables.

BACKGROUND

Distributed fiber optic sensors and cables are commonly clamped to the tubing or casing during run-in-hole. The cables are cut at packers and re-spliced once they are fed through the packers, or cut and spliced at sensor locations. Conventional practice is to take the cables and sensors to a cabin with positive pressure to remove any explosive gases, prepare and splice the fibers/cables, and then take the finished assembly to the rig-floor and attach the assembly to a pre-manufactured splice mandrel. The process of moving cables and system components takes time, and rig-time is very expensive. Any reduction in rig-time therefore results in significant savings.

BRIEF DESCRIPTION OF THE DRAWINGS

Illustrative aspects are described in detail below with reference to the following drawing figures.

DETAILED DESCRIPTION

Figure 1:
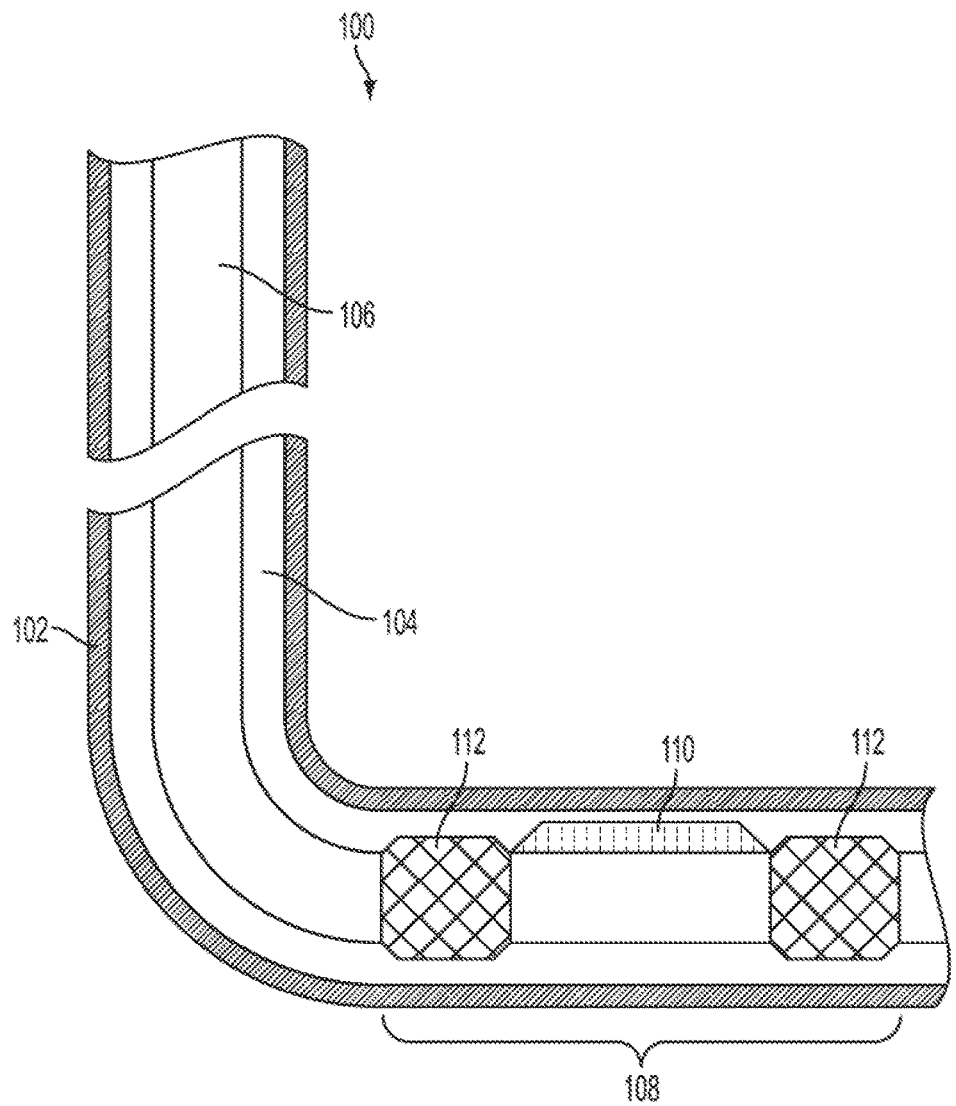
FIG. 1 is a schematic representing an apparatus and system having a modular downhole fiber optic accessory carrier body with securing rings positioned within a formation wellbore or cased hole, according to some aspects of the present disclosure.

In wellbore applications, the space occupied by tubing and tool strings run-in-hole is expensive and can be at a premium. Often, the size of a drilled wellbore, or the size of the wellbore after being lined with cement or other materials to become a cased hole, determines the corresponding size of a tool string to be run in the hole. The size of a mandrel to be run in hole corresponds to the size of the casing, i.e. the tubing of the tool string. The risk of damaging splices attached to the mandrel is lower if it is possible to utilize a smaller size completion or profile, there being a larger clearance or drift between tubing-conveyed components and the casing diameter. Moreover, a single-body mandrel is designed to survive bottom hole pressures during stimulation and production. In contrast, a modular carrier body mounted to a casing does not require the same design considerations necessary to survive bottom hole pressures as a single-body mandrel. External splice housings may be clamped to a casing, however, clamps and pins known in the industry can be susceptible to abuse and damage from friction against the walls of the wellbore or a cased hole.

Many tool string applications today use tubular linear splice housing for fiber optic splices, and Y-blocks can be attached to the end of the splice housing to break out a fiber for a sensor such as a pressure sensor. The length of the splice, or splice housing and Y-block, and associated machined mandrels may be substantial, which increases cost and complexity. A longer-machined mandrel, which is typically a single-body mandrel, requires a more expensive machine for manufacturing as compared to manufacturing a simple casing, and the complexity and cost is accordingly higher.

In the context of the present disclosure, a casing generally refers to tubing used for a tool string, a fiber optic accessory carrier body (or carrier body) refers to a housing that can be secured to the casing by one or more securing rings, and the combination of casing, carrier body, and securing ring(s) can be referred to as a modular mandrel. A mandrel generally refers to a length of pipe or tubing having some form of protrusion, where the protruding structure can protect material within structures housed within the mandrel. Such mandrels, as known in the industry, are generally non-modular mandrels and refer to a single-body mandrel construction.

A modular mandrel, as considered by the present disclosure, can be a carrier body mounted and secured onto any length of casing. Accordingly, the mandrel is modular because the carrier body can be located on or moved to particular sections of a casing, thereby providing an individualized mandrel structure, as needed for a given tool string application.

A modular fiber optic accessory carrier body according to aspects of the present subject matter can allow for the carrier body to rest on the outer diameter ("OD") of a casing. On one or both ends of a carrier body, a securing ring holds the carrier body, both axially and radially, to the casing. Such securing rings can be locked in position along the exterior of the well casing by a variety of structures. In some aspects, set screws may be used to lock securing rings in position relative to the casing, and also in a position to secure the carrier body to the casing. In other aspects, a slip ring and lock ring assembly may be used to lock securing rings in position relative to the casing, and also in a position to secure the carrier body to the casing.

The carrier body can have an interior space to retain and protect fiber optic lines and fiber optic line splicing structures. This interior space (also referred to as a housing) can encapsulate or surround either or both of a linear splice housing or a linear end termination housing, or portions thereof. In aspects, the interior space can be a groove, slot, or pocket in a modular carrier body having a cover piece encasing a portion of the groove. Tube-locking fittings can secure the FIMT containing the optical fiber to the carrier body and, effectively, to the casing. The carrier body can also have an external structure that allows for other external cables or wires to pass by and through the region of the modular carrier body without any need to bend or deform around the exterior structure of the modular carrier body 204. Such external structures of the carrier body can be bypass grooves, such as slots or pockets. The securing rings can have a bypass groove for both fiber cables running from the interior space of the carrier body as well as external cables positioned in bypass grooves of the carrier body. Multiple covers can provide for radial retention of any of the bypassing cables, linear splice housings, linear end termination housing, FIMT, or other fiber-containing tubing.

In some aspects, the modular fiber optic accessory carrier body containing a fiber optic splice housing can include splicing structures other than linear splices. For example, electronic sensors or mechanical tools can be housed within or coupled to the modular housing. Generally, the modular housing can simplify the construction of housing structures needed on the exterior of a casing, particularly in comparison to integral or solid-body mandrels, which can thereby further reduce the length or cost of the casing to which the modular housing is mounted. Further, splicing techniques and apparatus described herein can make use of a zone-rated fiber optic splice kit and techniques.

The illustrative examples herein are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "uphole," "downhole," "inward," "outward," etc. in relation to the illustrative aspects as they are depicted in the figures, the uphole direction being toward the surface of the well, the downhole direction being toward the toe of the well, the inward direction being toward the longitudinal axis (or centerline) of the tool string, casing, or mandrel, and the outward direction being away from the longitudinal axis of the tool string, casing, or mandrel. Further, portions of structural elements described herein can be referred to by their uphole or downhole ends. Like the illustrative aspects, the numerals and directional descriptions included in the following sections should not be used to limit the present disclosure.

FIG. 1 is a schematic representing an apparatus and system having a modular downhole fiber optic accessory carrier body with securing collars positioned within a formation wellbore, according to one aspect of the present disclosure. The schematic depicts an example wellbore system 100 having a tool string 106 that can extend into a wellbore 104 cut into the earth strata 102 of a formation. In some aspects, the wellbore 104 can be a cased hole. Although the wellbore system 100 is depicted with one tool string 106, any number of tools strings can be used in the wellbore system 100. The wellbore 104 can extend through various earth strata 102, and may have substantially vertical section and substantially horizontal sections. The tool string 106 can include one or more sensory tools, electronic accessories, mechanical accessories, or the like, and can further deliver and move such tools and accessories through the vertical and horizontal sections of the wellbore 104. In some applications, the tool string 106 and sensory tools may be used in a wellbore 104 that is only substantively vertical.

The tool string 106 can include a mounted fiber optic carrier body system 108 which includes a fiber optic accessory carrier body 110 and at least one securing ring 112. In some aspects, as illustrated in FIG. 1, two securing rings 112 (alternatively referred to as securing collars) can be positioned at each longitudinal end of a fiber optic carrier body 110. One securing ring 112 can be proximate to the opening of the wellbore 104 (i.e., toward the uphole end) and one securing ring 112 can be distal from the opening of the wellbore 104 (i.e., toward the downhole end). In some aspects, only one securing ring 112 can be used to retain and mount a fiber optic carrier body 110 to a tool string 106. For example, the securing ring 112 can be located at the longitudinal end of the fiber optic carrier body 110 either proximate to or distal from the opening of the wellbore 104. Further, although FIG. 1 depicts a tool string 106 having a fiber optic accessory carrier body 110 and two securing rings 112, multiple modular fiber optic accessory carrier bodies can be mounted to a tool string 106 for operation within a wellbore 104. In some aspects, some fiber optic accessory carrier bodies can be spaced along the tool string 106 at points appropriate for obtaining the length of fiber optic cable needed or at points appropriate for connecting to tools or sensors for operation at particular depths within the earth strata 102 of a formation.

Both a fiber optic accessory carrier body 110 and a securing ring 112 extend outward from the centerline of the tool string 106, and generally increase the diameter of the overall tool string in the locations where either the fiber optic accessory carrier body 110 or a securing ring 112 are mounted. The fiber optic accessory carrier body 110 and the one securing ring 112 can present a minimal profile such that the tool string 106 does not incur excessive abuse, damage, or otherwise encounter ledges, rocks, or other projections that may be present along the walls of the wellbore 104.

Figure 2:
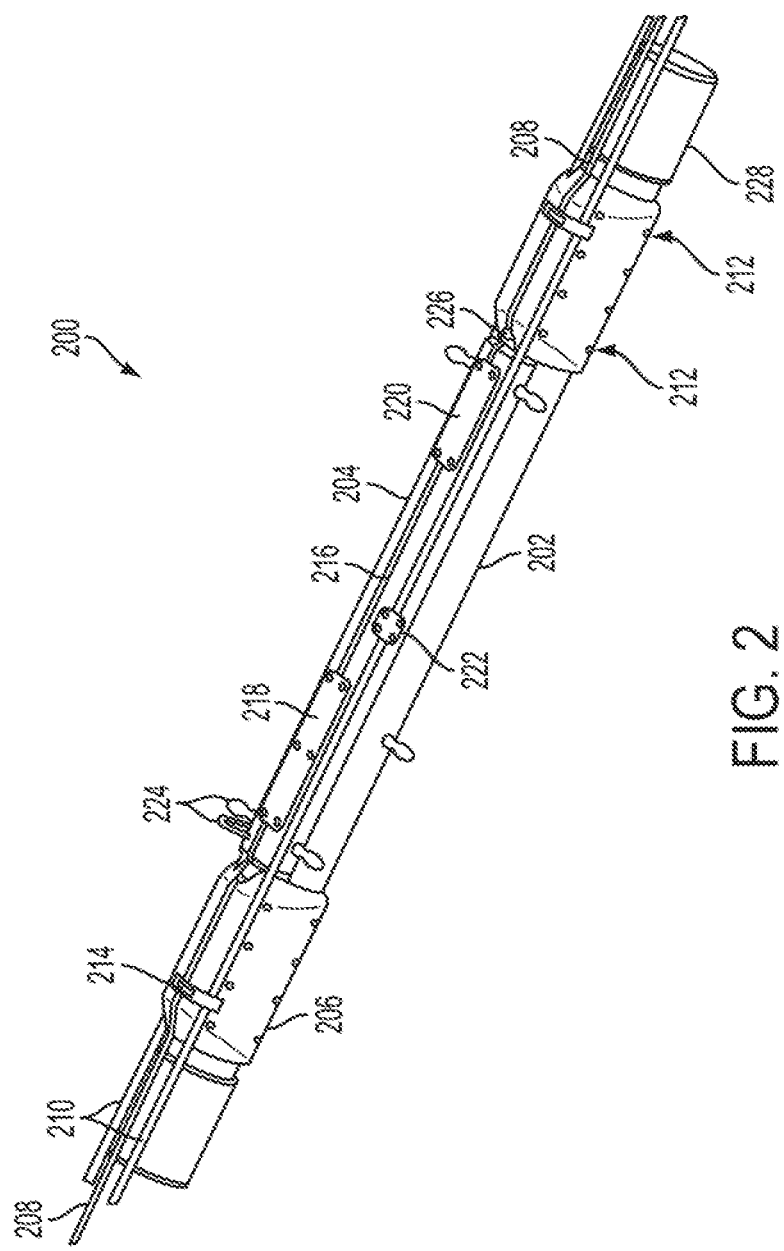
FIG. 2 is a top isometric view illustrating a casing having a modular fiber optic accessory carrier body mounted to the exterior of the casing, secured to the casing with two securing ring structures, according to some aspects of the present disclosure.

FIG. 2 is an isometric view illustrating a casing having a fiber optic accessory carrier body mounted to the casing exterior 200. The modular carrier body 204 can be secured to the casing 202 with two securing ring structures 206 (alternatively referred to as "securing collars"). A fiber optic line 208 (which can be optical fiber as FIMT) and two bypass cables 210 can be run along the exterior of the casing 202. The fiber optic line 208 can be connected and run into the modular carrier body 204 while the bypass cables 210 remain on the exterior of the modular carrier body 204. In some aspects, the fiber optic line 208 couples to a fiber optic splice housing located within the modular carrier body. The bypass cables 210 can be electrical cables, hydraulic cables, separate fiber optic cables, or other cabling as appropriate for a desired application. The two securing rings 206 can each be secured to positions on the outer diameter of the casing 202 by set screws 212 that can be driven inward toward the centerline of the casing 202.

The set screws 212 can have a flat point, domed point, cone point, cup point, knurled cup point, an extended point, or other like point. In other aspects, the set screws 212 can be of a straight slot, hex socket, square socket, external hex, external square, spline, Bristol spline, double hex, double square, triple square, tri-point, tri-wing, claw, clutch, line, one-way, pentalobe, polydrive, or other like drive type. In some aspects, the use of set screws 212 with securing rings 206 offers greater protection for the linear splice assemblies, at a lighter weight and with a more efficient profile than compared to standard clamps as known in the industry. Set screws 212 can be used to secure both the modular carrier body 204 and securing rings 206 to the casing. In either or both of the modular carrier body 204 and securing rings 206, set screws 212 can be arranged in a row generally conforming to the longitudinal axis of the casing. In other aspects, either or both of the modular carrier body 204 and securing rings 206 can have two rows of set screws 212, three rows of set screws 212, four rows of set screws 212, or a greater number of set screws 212 in rows or otherwise arranged as appropriate to hold such structures to the casing 202. In alternative aspects, set screws 212 can be arranged in a spiral configuration along the length of either or both of the modular carrier body 204 and securing rings 206.

Both the modular carrier body 204 and securing rings 206 are shaped to include bypass grooves to allow for the passage of cables along the length of the modular carrier body 204 and securing rings 206 without any need to bend or deform around the exterior structure of the modular carrier body 204 or the securing ring 206. The securing rings 206 can each have a securing ring cable clamp 214 that covers a portion of the bypass cables 210 and the fiber optic line 208 within the respective grooves in the securing ring 206. The securing ring cable clamp 214 can be shaped to fit along the curvature of the securing rings 206 and can maintain the radial position of the bypass cables 210 and the fiber optic line 208 along the longitudinal axis of the casing 202 and overall assembly. In some aspects, the securing ring cable clamp 214 can be a set of separate clamps to secure each bypass cable 210 and the fiber optic line 208 individually. In other aspects, the securing ring cable clamp 214 can be a set of separate clamps to secure at least one bypass cable 210 or the fiber optic line 208 individually, and to secure any remaining bypass cables 210 or the fiber optic line 208 with a single clamp.

The modular carrier body 204 can also include a linear fiber optic line housing 216, which can define an interior space (e.g., a covered region) within the modular carrier body 204. The linear fiber optic line housing 216 can include a groove portion to allow for passage of a fiber optic line 208 along the length of the modular carrier body 204. The linear fiber optic line housing 216 can further connect to an interior space, relatively larger in either or both of width and depth than a groove portion, where the interior space can receive and house components such as a linear splice housing or a linear end termination housing. The modular carrier body 204 can include at least one port for connecting a compression fitting for optical fiber, to allow for connections to sensors or other tools external to the modular carrier body 204. Accordingly, to protect such components, the modular carrier body 204 can include a first carrier body cover 218 to enclose an interior space of the modular carrier body 204 housing a first end of a linear splice housing assembly or linear end termination housing assembly. Similarly, the modular carrier body 204 can include a second carrier body cover 220 to enclose an interior space of the modular carrier body 204 housing a second end of a linear splice housing assembly or a linear end termination housing assembly. In some aspects, within the modular carrier body 204, includes a distinct first interior space and a distinct second interior space, where either or both of the first interior space and the second interior space both can enclose either of a linear splice housing assembly and a linear end termination housing assembly. Both the first carrier body cover 218 and the second carrier body cover 220 can be of a length and width sufficient to completely cover and encase the spaces holding the respective linear splice or end termination structures. In aspects, the first carrier body cover 218 can be oriented toward the uphole end of a section of casing. Conversely, in aspects, the second carrier body cover 220 can be oriented toward the downhole end of a section of casing, and can alternatively be referred to as a terminal cover. In other aspects, the modular carrier body 204 can include additional carrier body covers to protect other sections of a linear splice or end termination structure. The modular carrier body housing 204 further includes one or more carrier body bypass cable clamps 222 that covers a portion of the bypass cables 210 within their respective grooves in the modular carrier body housing 204. The carrier body bypass cable clamps 222 can be shaped to fit along the shape of the modular carrier body housing 204 and can maintain the radial position of the bypass cables 210 along the longitudinal axis of the casing 202 and overall assembly.

Aspects of the modular carrier body housing 204 further include the capability to couple with lifting gear 224 (alternatively referred to as handling gear). The lifting gear 224 can be attached to either or both ends of the modular carrier body 204 and provide for handles, hooks, or other such leverage points to facilitate the positioning and mounting of the modular carrier body housing 204 on the exterior surface of a casing 202. As the modular carrier body housing 204 is positioned and held to the surface on the casing by use of the lifting gear, one or more securing rings 206 can be attached to one or both ends of the modular carrier body housing 204 to secure the modular carrier body housing 204 to the outer diameter of the casing 202. The lifting gear 224 is detachable such that once the modular carrier body is secured to a casing 202, the lifting gear 224 can be removed before the overall assembly is deployed downhole. In aspects, the lifting gear 224 is removably attachable from the modular carrier body housing 204.

In further aspects, the portion of fiber optic line 208 that extends from either end of the modular carrier body housing 204 requires connection to portions of the fiber optic line 208 that run uphole or downhole further along the length of the casing 202. Accordingly, at the intersection of the modular carrier body 204 and each securing ring 206, the fiber optic line 208 is connected and secured by tube-locking fittings 226, which in aspects can be compression fittings. A fiber optic line 208 that connects to a modular carrier body housing 204, can be connected to a separate and distinct fiber optic line 208 on the opposing side of the modular carrier body housing 204, via a structure such as a linear splice assembly housed by the modular carrier body housing 204. The tube-locking fittings 226 used to secure the fiber optic line 208 further restrain axial motion of the fiber optic line 208, providing for a structural point by which the fiber optic line 208 is held and locked in place relative to the modular carrier body 204 and securing ring 206.

In some aspects, couplings 228 or centralizers (not shown) can be optionally positioned relative to one or both of the securing rings 206 in a sufficiently close proximity to reduce the likelihood of displacement of the securing rings 206 due to contact with ledges, rocks, or other projections that may be present in a wellbore 104. Such couplings 228 or centralizers may be in direct contact with the securing rings 206.

Figure 3A:
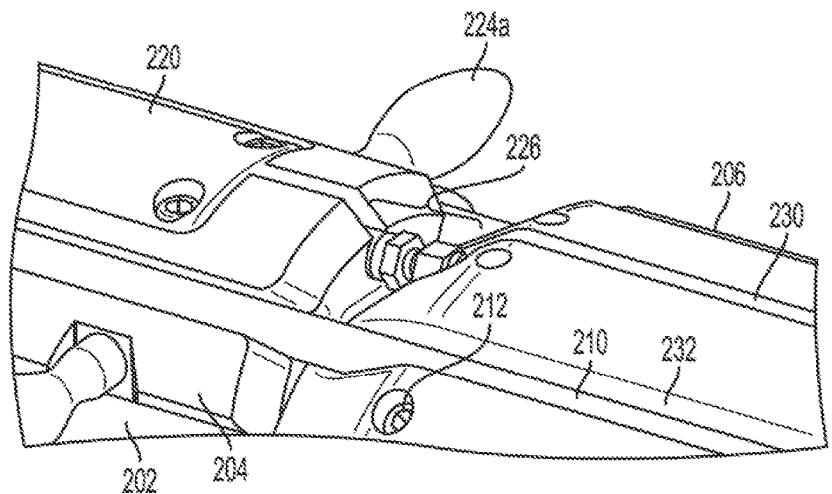
FIG. 3A is a first isometric view illustrating an interface of a fiber optic carrier body and securing ring, mounted to the exterior of a casing, according to some aspects of the present disclosure.

FIG. 3A is a first isometric view illustrating the interface of a fiber optic carrier body 204 and securing ring 206, mounted to the exterior of a casing 202. FIG. 3A provides further detail illustrating a second carrier body cover 220, lifting handles 224a, tube-locking fittings 226, and bypass groove structures 232 in the securing ring 206. In particular, the lifting handles 224a are one implementation of lifting gear 224, where in this aspect, the lifting handles 224a are positioned on the sides of the modular carrier body 204, projecting laterally from directly opposing positions on each side wall of the modular carrier body 204. Further illustrated are the securing ring fiber optic line groove 230 and the securing ring bypass grooves 232. The securing ring fiber optic line groove 230 allows for FIMT, i.e., the fiber optic line 208, extending from the modular carrier body 204, connected via a tube-locking fitting 226, to run along the length of the casing 202 through the profile of the securing ring 206 without any need to bend or deform around the exterior structure of the securing ring 206. Similarly, securing ring bypass grooves 232 allow for bypass cables 210 to run along the length of the casing 202 through the profile of the securing ring 206 without any need to bend or deform around the exterior structure of the securing ring 206. In aspects as illustrated, two bypass cables 210 can run parallel to the fiber optic line 208, with one bypass cable 210 on each side, laterally offset from the fiber optic line 208. In other aspects, there can be more than one bypass cable 210 offset on one or both sides from the fiber optic line 208, or one or more bypass cables 210 on only one side of the fiber optic line 208. The securing ring 206 can have securing ring bypass grooves 232 to accommodate the desired number and arrangement of bypass cables 210 to be run downhole alongside the fiber optic line 208 and casing 202.

Figure 3B:
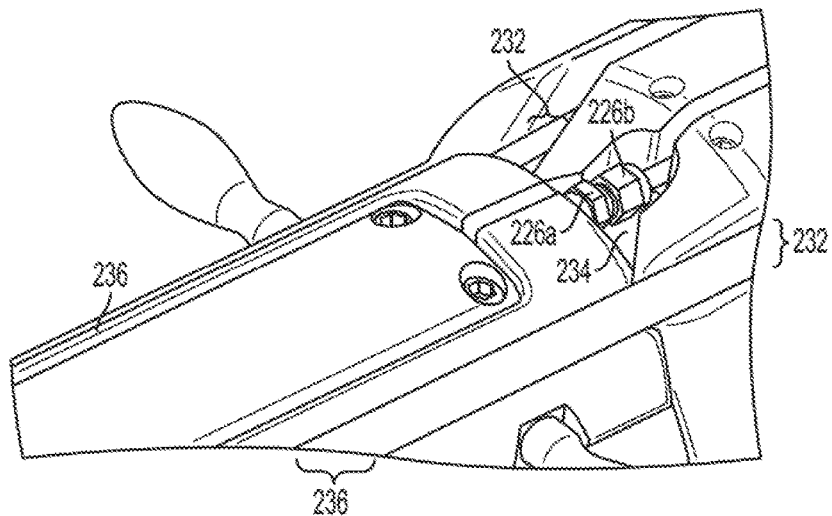
FIG. 3B is a second isometric view illustrating the interface of FIG. 3A, according to some aspects of the present disclosure.

FIG. 3B is a second isometric view illustrating the interface of a fiber optic carrier body and securing ring, mounted to the exterior of a casing. FIG. 3B provides further detail illustrating the tube-locking fittings 226, and bypass groove structures in the modular carrier body 204. In particular, the tube-locking fittings 226 are shown to have a tube-locking male coupling 226a and a tube-locking female coupling 226b. In aspects, the modular carrier body 204 includes a carrier body tongue 234 that extends from the base of the modular carrier body 204, shaped to conform to the curvature of the casing 202. In alternative aspects, the carrier body tongue 234 does not necessarily conform to the curvature of the casing 202. The carrier body tongue 234 projects outward such that a securing ring 206, when placed proximate to an end of the modular carrier body 204, is positioned above the carrier body tongue 234 and holds the carrier body tongue 234 flush against the casing 202. Accordingly, when a securing ring 206 is locked in position on a casing 202 with a carrier body tongue 234 beneath at least a portion of the securing ring 206, the modular carrier body 204 is secured axially and radially to the casing 202. In aspects, the carrier body tongue 234 can extend from the modular carrier body 204 base by a length that allows the carrier body tongue 234 to engage with and fit within a cavity formed between the modular carrier body 204 and securing ring 206. In some aspects, the carrier body tongue 234 can be from about one (1") to three (3") inches in length. In other aspects, the carrier body tongue 234 can be about two and five-sixteenth (2 5/16") inches in length. Accordingly, the securing rings 206 can be configured to have a cavity that can receive and hold the carrier body tongue 234, where the cavity can match the shape and dimensions of the carrier body tongue 234.

The modular carrier body 204 further includes carrier body bypass grooves 236 which allow for bypass cables 210 to run along the length of the casing 202 through the profile of the carrier body 204 without any need to bend or deform around the exterior structure of the modular carrier body 204. In aspects as illustrated, two bypass cables 210 can run parallel to the fiber optic line 208 (and linear splicing structures located within the modular carrier body 204), with one bypass cable 210 on each side, radially or laterally offset from the fiber optic line 208. In other aspects, there can be more than one bypass cable 210 offset on one or both sides from the fiber optic line 208, or one or more bypass cables 210 on only one side of the fiber optic line 208. The modular carrier body 204 can have carrier body bypass grooves 236 to accommodate the desired number and arrangement of bypass cables 210 to be run downhole alongside the fiber optic line 208 and casing 202.

Figure 4A:
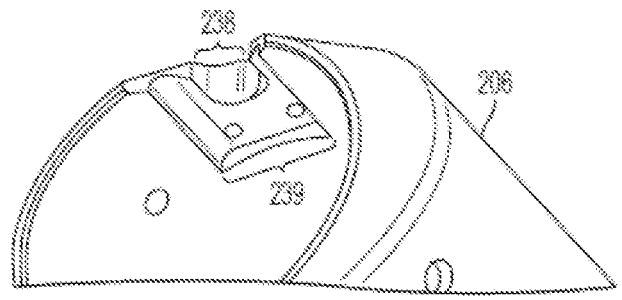
FIG. 4A is a bottom isometric view illustrating a securing ring for use in a modular mounted fiber optic accessory carrier body system, according to some aspects of the present disclosure.

FIG. 4A is a bottom isometric view illustrating a securing ring 206 for use in a modular mounted fiber optic accessory carrier body system. The illustration isolates the securing ring 206 further defining the shape of the securing ring 206, in particular showing a securing ring fitting notch 238. The securing ring fitting notch 238 is configured to provide sufficient space for tube-locking fittings 226 to be located in the space of the fitting notch 238 when the overall fiber optic accessory modular carrier body 204 is mounted to the casing 202 exterior with one or more securing rings 206 in place. The securing ring 206 further includes a tongue-receiving gap 239 which is shaped to receive a carrier body tongue 234. The tongue-receiving gap 239 defines a cavity along the interior diameter of the securing ring 206 which can conform to the shape of a carrier body tongue 234 such that when the securing ring 206 is locked in position to a casing 202, the carrier body tongue 234 fits tightly within the space between the tongue-receiving gap 239 and the casing 202. In some aspects, the carrier body tongue 234 can fit flush against the lateral side walls defining the width of the tongue-receiving gap 239 with a space between a top surface of the carrier body tongue 234 and the radial wall (i.e., the wall distal and radially offset from the outer diameter of the modular carrier body 204). In other aspects, the tongue-receiving gap 239 may be radially deeper than the thickness of the carrier body tongue 234, and remaining space of the tongue-receiving gap 239 can be reduced by tightening of setscrews 212 located in the securing ring 206 in the region of the carrier body tongue 234.

Figure 4B:
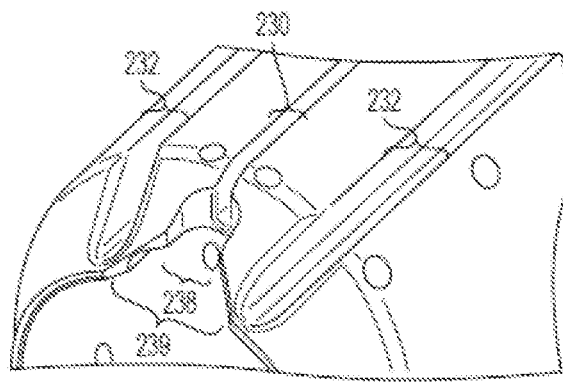
FIG. 4B is a top isometric view illustrating the securing ring of FIG. 4A, according to some aspects of the present disclosure.

FIG. 4B is a top isometric view illustrating the securing ring, as shown in FIG. 4A, for use in a modular mounted fiber optic accessory carrier body system. The opening width of the securing ring fitting notch 238 and the opening width of the tongue-receiving gap 239 are further illustrated for some aspects of the securing ring 206. The ends of the securing ring are shown in detail to be at an angle, slanted, or tapered on each end, such that the securing ring 206 does not have any edge or lip that may catch on ledges or projections within a wellbore 104. In aspects, both ends of each securing ring 206 can be constructed at an angle, slanted, or tapered, while in other aspects only one end of a securing ring 206 can be at an angle, slanted, or tapered. The securing ring fiber optic line groove 230 and securing ring bypass grooves 232 are also further illustrated, with these grooves extending through the length of the securing ring.

Figure 4C:
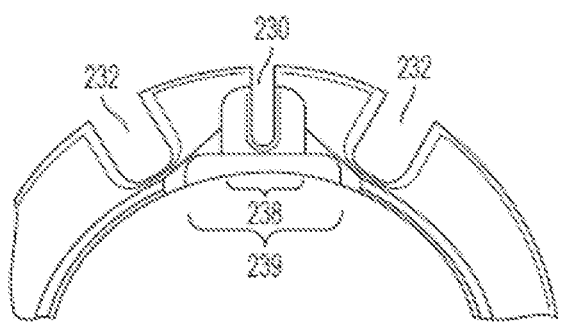
FIG. 4C is a front view illustrating the securing ring of FIG. 4A, according to some aspects of the present disclosure.

FIG. 4C is a front view illustrating a securing ring, as shown in FIG. 4A, for use in a modular mounted fiber optic accessory carrier body system. As illustrated, the securing ring fiber optic line groove 230 has a width that is relatively narrower than the width of the securing ring bypass grooves 232. In some aspects, the widths of the securing ring fiber optic line groove 230 and securing ring bypass grooves 232 can be equal, while in other aspects the securing ring fiber optic line groove 230 has a width that is relatively wider than the width of the securing ring bypass grooves 232. The width of either or both of the securing ring fiber optic line groove 230 and the securing ring bypass grooves 232 can be configured to accommodate encapsulated cable.

Figure 5A:
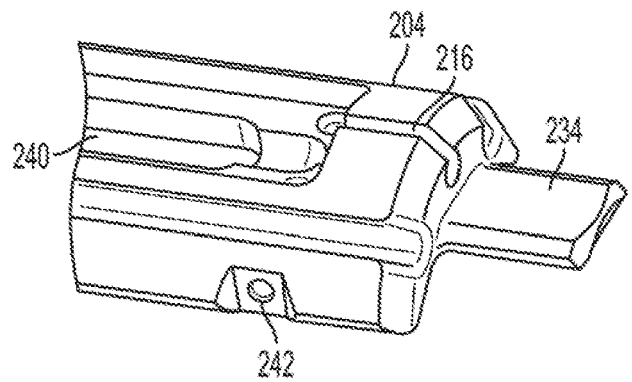
FIG. 5A is a top isometric view illustrating a modular carrier body, particularly an end of a modular carrier body having a carrier body tongue, according to some aspects of the present disclosure.

FIG. 5A is a top isometric view illustrating a modular carrier body 204, particularly an end of a modular carrier body 204 having a carrier body tongue 234. The illustration isolates the modular carrier body 204 further defining the arrangement of the linear fiber optic line housing 216 in relation to a carrier body interior space 240. The carrier body interior space 240 is the space within the modular carrier body 204 where fiber optic line splice housings, sensors, mechanical tools, and other apparatus can be stored to be protected or shielded when inserted downhole on a tool string 106. The carrier body interior space 240 can be covered, depending on the apparatus located therein, with a first carrier body cover 218, a second carrier body cover 220, or other like cover as appropriate. Further shown is a lifting gear port 242, to which lifting gear 224 (which can be a lifting handle 224a, a lifting hook 224b, or other like lifting structure as appropriate) can attach and couple, thereby providing leverage points to facilitate the positioning and mounting of the modular carrier body housing 204. In aspects, a modular carrier body 204 can have one or more carrier body interior space 240 areas, depending on the apparatus to be held within the overall system of the fiber optic accessory carrier body mounted to the exterior of the casing 200.

Figure 5B:
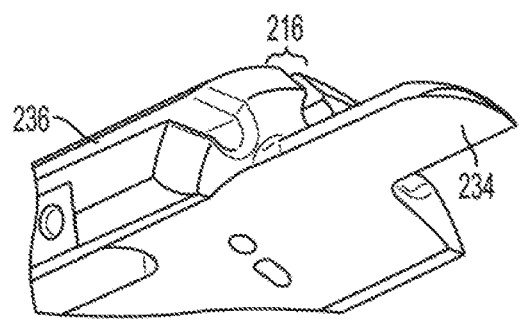
FIG. 5B is bottom isometric view illustrating the modular carrier body of FIG. 5A, according to some aspects of the present disclosure.

FIG. 5B is bottom isometric view illustrating a modular carrier body 204, as shown in FIG. 5A, particularly an end of a modular carrier body 204 having a carrier body tongue 234. FIG. 5B further illustrates how the configuration and shape of a modular carrier body 204 can conform to the outer diameter of a casing 202. A carrier body bypass groove 236 is further shown in an aspect where the depth of the carrier body bypass groove 236 extends a substantial distance into the overall thickness of the modular carrier body 204. In alternative aspects, the carrier body bypass grooves 236 can have a depth that extends to a lesser degree than shown, and in further alternative aspects with more than one carrier body bypass groove 236 on a modular carrier body 204, the carrier body bypass grooves 236 can have variable and different depths. The size and depth of the carrier body bypass grooves 236 can be selected as appropriate to the bypass cables 210 to be used with the overall system of the fiber optic accessory carrier body mounted to the exterior of the casing 200.

Figure 5C:
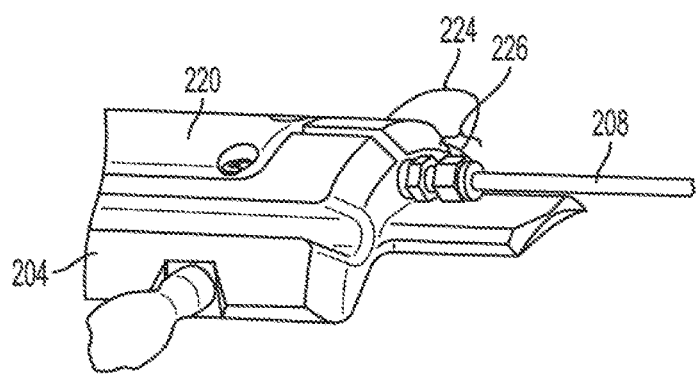
FIG. 5C is an isometric view illustrating the modular carrier body of FIG. 5A, particularly showing lifting gear and a fiber optic line connected to the modular carrier body by tube-locking fittings, according to some aspects of the present disclosure.

FIG. 5C is an isometric view illustrating a modular carrier body 204 as shown in FIG. 5A, particularly showing lifting gear 224 and a fiber optic line 208 (e.g. a FIMT) connected to the modular carrier body 204 by tube-locking fittings 226. The illustration shows the arrangement of the modular carrier body 204 mounted on a casing 202 in the absence of securing rings 206. Further shown is the arrangement of the linear fiber optic line 208 and tube-locking fittings 226 as they extend from the carrier body interior space 240 (as shown covered by a second carrier body cover 220) and linear fiber optic line housing 216 of the modular carrier body 204. When assembled in conjunction with a securing ring, the linear fiber optic line 208 extending from the modular carrier body 204 can be located within a securing ring fiber optic line groove 230 and the tube-locking fittings 226 can be within the space defined by a securing ring fitting notch 238.

Figure 6A:
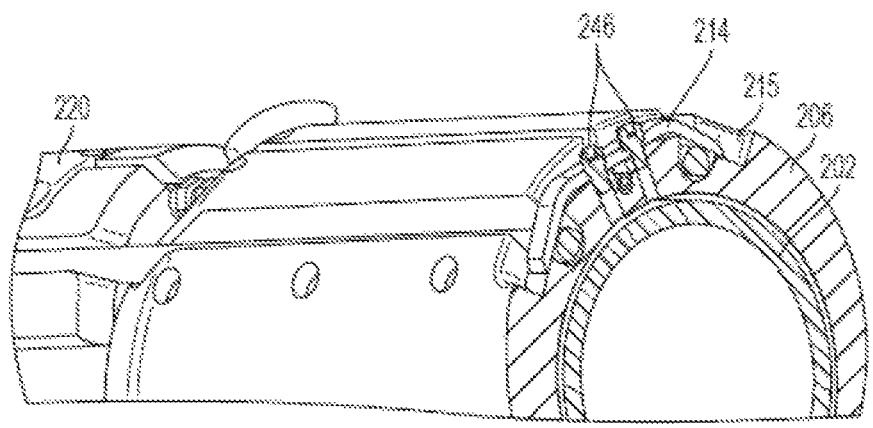
FIG. 6A is an isometric cross-sectional view illustrating a securing ring mounted on a casing, particularly showing a portion of the securing ring having bypass grooves and a cable clamp, according to some aspects of the present disclosure.

FIG. 6A is an isometric cross-sectional view illustrating a securing ring 206 mounted on a casing 202, particularly showing a portion of the securing ring 206 having bypass grooves 236 and a securing ring cable clamp 214. The illustration shows a cross-section where the securing ring cable clamp 214 that fits within a securing ring clamp cavity 215 in the securing ring 206. The securing ring bypass grooves 232 and securing ring fiber optic line groove 230, can in part run into the space of the securing ring clamp cavity 215. As the bypass cables 210 and linear fiber optic line 208 pass along the securing ring bypass grooves 232 and securing ring fiber optic line groove 230, respectively, the securing ring cable clamp 214 can be located within the securing ring clamp cavity 215 to hold the bypass cables 210 and linear fiber optic line 208 in place along the longitudinal axis of the securing ring 206. The securing ring cable clamp 214 can be attached and tightened to the securing ring 206 by one or more headed fasteners 246. In various aspects, the headed fasteners 246 can be threaded or non-threaded bolts or screws, having or lacking shoulders, and having or lacking driving slots. The securing ring cable clamp 214 and respective securing ring clamp cavity 215 can be located at any point along the main body portion of the securing ring 206 so long as the securing ring cable clamp 214 functions to prevent unwanted radial movement of the linear fiber optic line 208 and the bypass cables 210. In aspects, the securing ring cable clamp 214 can bend or flex as it is tightened with the one or more headed fasteners 246.

Figure 6B:
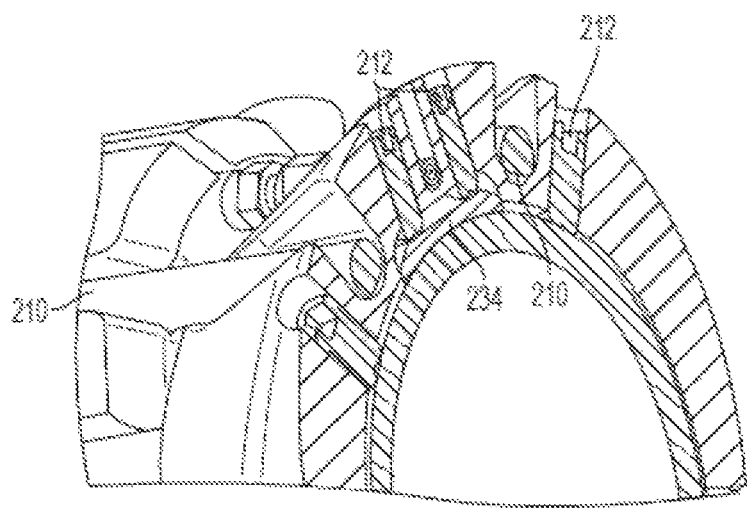
FIG. 6B is an isometric cross-sectional view illustrating the securing ring mounted on a casing of FIG. 6A, particularly showing a portion of the securing ring located proximate to a carrier body tongue with set screws in contact with both the carrier body tongue and casing, according to some aspects of the present disclosure.

FIG. 6B is an isometric cross-sectional view illustrating a securing ring 206, as shown in FIG. 6A, mounted on a casing 202, particularly showing a portion of the securing ring 206 located proximate to a carrier body tongue 234 with a pair of set screws 212 in contact with the carrier body tongue 234 and a separate pair of set screws 212 in contact with the casing 202. The arrangement at the junction of the modular carrier body 204 and the securing ring 206 on the casing 202 allows for the carrier body tongue 234 to fit beneath the securing ring 206. The illustration further shows the use of set screws 212 to hold the modular carrier body 204 (via the carrier body tongue 234) directly against the casing 202. As shown, the carrier body tongue 234 fits in the tongue-receiving gap 239 defined by the space between the casing 202 and the shape of the securing ring 206 at the end of the securing ring 206 proximate to the modular carrier body 204.

Figure 7A:
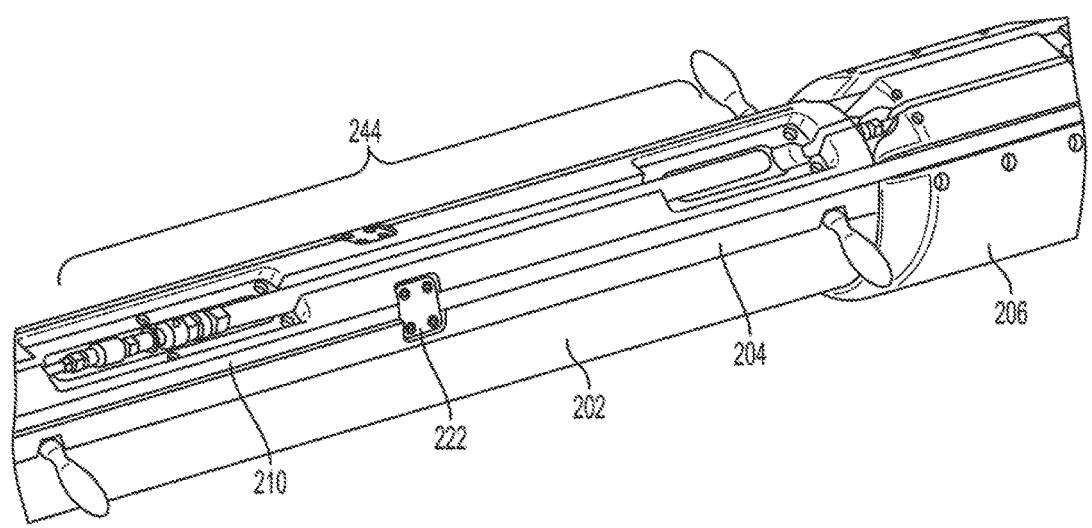
FIG. 7A is an isometric view illustrating a modular fiber optic accessory carrier body, mounted on a casing, and secured to the casing with at least one securing ring, particularly showing an end termination assembly, located within the modular fiber optic accessory carrier body, according to some aspects of the present disclosure.

FIG. 7A is an isometric view illustrating a modular fiber optic accessory carrier body 204, mounted on a casing 202, and secured to the casing 202 with at least one securing ring 206, particularly showing an end termination assembly 244, located within the modular fiber optic accessory carrier body 204. The end termination assembly 244 generally operates to end a fiber optic line. Further shown is a carrier body bypass cable clamp 222 which covers a portion of the bypass cables 210 within their respective grooves in the modular carrier body housing 204 to maintain the radial position of the bypass cables 210 along the longitudinal axis of the casing 202. In some aspects, the carrier body bypass cable clamp 222 can be shaped to fit into a cavity cut into the modular carrier body housing 204 while in other aspects the carrier body bypass cable clamp 222 can be attached on top of the body of the modular carrier body housing 204. In other aspects, the carrier body bypass cable clamp 222 can be attached anywhere along the length of the modular carrier body housing 204. When in operation downhole, the interior spaces shown are covered by carrier body covers as discussed above.

Figure 7B:
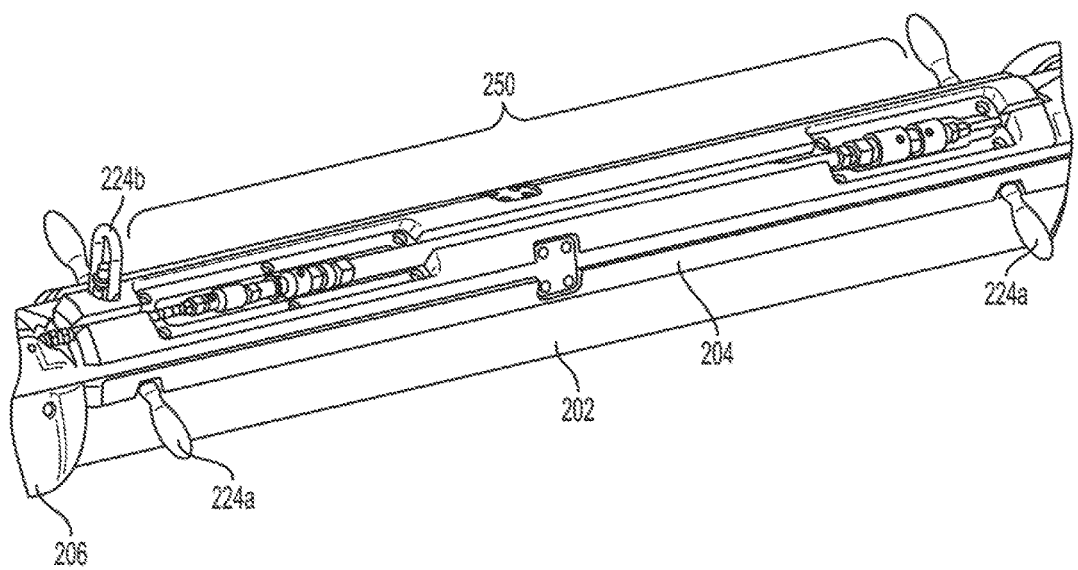
FIG. 7B is an isometric view illustrating a modular fiber optic accessory carrier body, mounted on a casing, and secured to the casing with at least one securing ring, particularly showing a splice housing assembly, located within the modular fiber optic accessory carrier body, according to some aspects of the present disclosure.

FIG. 7B is an isometric view illustrating a modular fiber optic accessory carrier body 204, mounted on a casing 202, and secured to the casing 202 with at least one securing ring 206, particularly showing a splice housing assembly 250, located within the modular fiber optic accessory carrier body 204. The splice housing assembly 250 can include ports to which sensors can attach, and the first carrier body cover 218, the second carrier body cover 220, or other covers can include corresponding ports to provide for connections to sensors.

Further shown is a lifting hook 224b which can be provided as a leverage point to facilitate the positioning and mounting of the modular carrier body housing 204. In various aspects, a modular carrier body 204 can have either one or both lifting handles 224a and a lifting hook 224b coupled to the modular carrier body 204 for manipulation of the modular carrier body 204. Other forms of lifting gear 224 may also be used to handle the modular carrier body 204, and in further aspects, lifting handles 224a, lifting hook 224b, or other lifting gear 224 may be detachable from the modular carrier body 204 or a permanent structural feature of the modular carrier body 204.

Generally, the size and weight of the modular carrier body 204 will be dependent on the size and outer diameter of the casing 202 to which the modular carrier body 204 is to be mounted. Accordingly, in some aspects, the modular carrier body 204 can have a weight of about 50-60 pounds, while in some aspects, the outer diameter of a casing 202 can be about 5-6 inches. In alternative aspects, the modular carrier body can have a greater or lesser weight and the casing 202 can have a wider or narrower outer diameter, depending on the application and related wellbore 104. The dimensions (e.g. length, width, depth, wall thickness) of the modular carrier body 204, and by extension the carrier body interior space 240 areas, are determined by the size of apparatus, such as the size of a linear splice housing, to be held within the modular carrier body 204. Further, each cover for each carrier body interior space 240 area can be removable, and can be proportioned to sufficiently protect the related carrier body interior space 240.

In some aspects, a carrier body can be mounted onto a length of casing referred to as a collar joint, being about thirty feet (30') in length. In other aspects, a carrier body can be mounted onto a length of casing referred to as a pup joint, being about fifteen feet (15') in length or shorter. In further aspects, a carrier body can be mounted onto a length of casing from about fifteen feet to about thirty feet.

In alternative aspects, the modular housing body can contain other fiber optic splicing structures. For example, fiber optic cable can be arranged in a circular, oval or oblong, or otherwise appropriately shaped channel, race-track, or raceway configuration in the modular housing body. Further, multiple fiber optical cables can be spliced together, split (e.g. using a Y-split), or terminated in the modular housing body. Such structures may include one or a plurality of cable wind cylinders, disks, or half-disks integrally formed with the housing, or secured to the housing by screws, bolts, pins or other appropriate fasteners. In further aspects, the numbers and locations of ports and compression fittings could be increased or decreased along the modular carrier body 204 in order to provide appropriate access consistent with the needs of a particular installation.

To assemble the fiber optic accessory carrier body as mounted to the casing exterior 200, the modular carrier body 204 is mounted to a casing 202 section outside of a wellbore 104. The modular carrier body 204 can be positioned on the casing 202 section proximate to the end of the casing 202 section that will be relatively uphole when inside a wellbore 104. One or two securing rings 206 can then be positioned over at least a portion of the modular carrier body 204, and then locked in place to secure the modular carrier body to the casing 202 section.

The fiber optic accessory carrier body mounted to the casing exterior 200 is used as a component of a tool string 106, and is positioned on the tool sting 106 to operate at a predetermined depth in the wellbore. In some aspects, the casing 200 section to which the modular carrier body 204 is attached is the section of the tool string 106 arranged to operate at the terminal depth (i.e., bottom) of a wellbore 104. In other aspects, the casing 200 section to which the modular carrier body 204 is attached is the section of the tool string 106 arranged to operate at one joint (i.e., one casing section) above the terminal depth of a wellbore 104. In further aspects, the casing 200 section to which the modular carrier body 204 is attached is arranged to operate at any intermediary depth within a wellbore 104. Tools and sensors that are held within the modular carrier body 204 can be configured to operate at any depth, location, or mode along the tool string 106 where the modular carrier body 204 is located.

In aspects, additional casing joints can be positioned uphole or downhole along the tool string 106 relative to the fiber optic accessory carrier body as mounted to the casing exterior 200. In other aspects, additional carrier items, tools, or sensors can be positioned uphole or downhole along the tool string 106 relative to the fiber optic accessory carrier body as mounted to the casing exterior 200.

The subject matter of aspects and embodiments of this patent is described here with specificity to meet statutory requirements, but this description is not necessarily intended to limit the scope of the claims. The claimed subject matter may be embodied in other ways, may include different elements or steps, and may be used in conjunction with other existing or future technologies. Throughout this description for the purposes of explanation, numerous specific details are set forth in order to provide a thorough understanding of embodiments and aspects of the subject matter disclosed herein. It will be apparent, however, to one skilled in the art that the many embodiments or aspects may be practiced without some of these specific details. In some instances, well-known structures and devices are shown in diagram or schematic form to avoid obscuring the underlying principles of the described embodiments or aspects. This description should not be interpreted as implying any particular order or arrangement among or between various steps or elements except when the order of individual steps or arrangement of elements is explicitly described.

The foregoing description of the disclosure, including illustrated aspects and examples has been presented only for the purpose of illustration and description and is not intended to be exhaustive or to limit the disclosure to the precise forms disclosed. Numerous different modifications, adaptations, and arrangements of the components depicted in the drawings or described above, as well as components and steps not shown or described, are possible. Similarly, some features and subcombinations are useful and may be employed without reference to other features and subcombinations. Embodiments and aspects of the subject matter have been described for illustrative and not restrictive purposes, and alternative embodiments or aspects will become apparent to those skilled in the art without departing from the scope of this disclosure. Accordingly, the present subject matter is not limited to the embodiments or aspects described above or depicted in the drawings, and various embodiments, aspects, and modifications can be made without departing from the scope of the claims below.

That which is claimed is:

1. An assembly for use in a well, comprising:
    a casing section;
    a modular carrier body having a shape conforming to an outer diameter of the casing section, and having a carrier body interior to house at least one fiber optic line linearly spliced within the carrier body interior housing;
    a securing ring having a shape conformable to the outer diameter of the casing section and at least a portion of a surface of the modular carrier body for securing the modular carrier body to the casing section; and
    at least one port through the modular carrier body for connecting a compression fitting for the at least one fiber optic line,
    wherein the modular carrier body further comprises a carrier body tongue that extends from a base of the modular carrier body and is shaped to fit between the securing ring and the casing section.

2. The assembly according to claim 1, further comprising at least one lifting gear removably attachable to the modular carrier body.

3. The assembly according to claim 1, wherein the securing ring is shaped to retain the modular carrier body flush against the outer diameter of the casing section to prevent both axial and radial movement of the modular carrier body on the outer diameter of the casing section.

4. The assembly according to claim 1, wherein the modular carrier body includes at least one groove to allow at least one bypass cable to pass through a profile of the modular carrier body.

5. The assembly according to claim 1, wherein the securing ring includes at least one groove to allow at least one bypass cable to pass through a profile of the securing ring.

6. The assembly according to claim 1, wherein the at least one port through the modular carrier body includes a tube-locking fitting.

7. The assembly according to claim 1, wherein the securing ring includes:
    a first securing ring having a shape conformable to the outer diameter of the casing section and a first end portion of the modular carrier body for securing the modular carrier body to the casing section; and
    a second securing ring having a shape conforming to the outer diameter of the casing section and a second end portion of the modular carrier body, for securing the modular carrier body to the casing section.

8. The assembly according to claim 7, wherein the first securing ring and second securing ring are shaped to retain the modular carrier body flush against the outer diameter of the casing section to prevent both axial and radial movement of the modular carrier body on the outer diameter of the casing section.

9. The assembly according to claim 7, wherein the second securing ring includes grooves to allow at least one bypass cable and a fiber optic line to pass through a profile of the second securing ring.

10. The assembly according to claim 1, further comprising a plurality of set screws that secure the securing ring to the casing section.

11. The assembly according to claim 1, wherein the carrier body interior further comprises a first interior space and a second interior space housing an end termination assembly.

12. The assembly according to claim 1, wherein the carrier body interior further comprises a first interior space and a second interior space housing a linear splice assembly.

13. An assembly for use in a well, comprising:
    a casing section;
    a modular carrier body having a shape conforming to an outer diameter of the casing section, the modular carrier body including (i) a carrier body interior that houses a splice housing assembly for housing a splice of at least one fiber optic line therein and (ii) at least one groove to allow a bypass cable to pass through a profile of the modular carrier body;
    a securing ring having a shape conformable to the outer diameter of the casing section and at least a portion of a surface of the modular carrier body for securing the modular carrier body to the casing section, the securing ring including (i) a fiber optic line groove to allow the at least one fiber optic line to pass through a profile of the securing ring and (ii) at least one bypass groove to allow the bypass cable to pass through the profile of the securing ring; and
    at least one port through the modular carrier body for providing a compression fitting connection between a portion of the at least one fiber optic line within the carrier body interior with a portion of the at least one fiber optic line that passes through the fiber optic line groove in the securing ring,
    wherein the modular carrier body further comprises a carrier body tongue that extends from a base of the modular carrier body and is shaped to fit within a cavity in the securing ring.

14. The assembly according to claim 13, further comprising at least one clamp positioned to prevent radial movement of either or both of the bypass cable and the at least one fiber optic line.

15. A method of assembling a modular carrier body mounted to an exterior of a casing, comprising:

lifting the modular carrier body and positioning the modular carrier body on the exterior of a casing;
retaining at least one fiber optic line assembly including a linearly spliced fiber optic line within the modular carrier body;
placing at least one securing ring around the exterior of the casing and over at least an end of the modular carrier body, the at least one securing ring having a shape conformable to the outer diameter of the casing and at least a portion of a surface of the modular carrier body; and
securing the at least one securing ring with a plurality of set screws, wherein the modular carrier body includes:
a port for connecting a compression fitting for the at least one fiber optic line assembly, and
a carrier body tongue that extends from a base of the modular carrier body and is shaped to fit between the securing ring and the casing.

16. The method according to claim 15, wherein the at least one securing ring is placed over the carrier body tongue of the modular carrier body such that the carrier body tongue is secured between the at least one securing ring and the casing exterior.

17. The method according to claim 15, wherein the modular carrier body is positioned proximate to the end of the casing that will be oriented uphole within a wellbore.

18. The method according to claim 15, wherein the modular carrier body is mounted on a casing configured to be positioned at or proximate to a terminal depth of a wellbore.

* * * * *